United States Patent [19]

Gilbaugh

[11] 3,865,055

[45] Feb. 11, 1975

[54] PLANT TRANSPLANTER

[76] Inventor: John W. Gilbaugh, 19396 Monte Vista Dr., Saratoga, Calif. 95070

[22] Filed: Apr. 26, 1973

[21] Appl. No.: 354,751

[52] U.S. Cl............................ 111/4, 111/99, 172/22
[51] Int. Cl............................................... A01c 11/00
[58] Field of Search.......... 111/4, 2, 92, 99; 172/22; 292/50.5

[56] References Cited
UNITED STATES PATENTS

| 127,150 | 5/1872 | Cook | 111/4 X |
|---|---|---|---|
| 235,463 | 12/1880 | Sidwell | 111/4 X |
| 969,701 | 9/1910 | Jaynes | 111/4 X |
| 2,036,433 | 4/1936 | Nisewanger | 111/4 X |

Primary Examiner—Stephen C. Pellegrino

[57] ABSTRACT

A cylindrical blade with plant-entry side opening attached to either of two frame designs which are equipped with a crossbar handle. Plant-entry side opening of blade is provided along one side with an inturned lip to prevent blade, when inserted in ground and encircling plant, from slipping around soil and plant contained therein. Other edge of plant-entry opening is sharpened to cut roots and soil extending through plant-entry opening when transplanter is rotated by turning crossbar handle. An ejector with ring which has side opening aligned with side-entry opening in blade, side rods to stabilize ejector in its vertical sliding action, and an offset foot piece for ejection are provided. Adjustment for transplanter-blade-ground-depth insertion is provided for by use of an eye bolt adjustably mounted on side of one frame member.

5 Claims, 7 Drawing Figures

PATENTED FEB 11 1975    3,865,055

PLANT TRANSPLANTER

DESCRIPTION OF THE INVENTION

This invention relates to plant transplanters with novel and improved features.

An object of this invention is to provide an improved plant transplanter which may be economically and efficiently manufactured and which is dependable in operation.

Another object of this invention is to provide an improved plant transplanter equipped with a cylindrical blade sharpened around the lower cutting edge for easy insertion into the ground by means of which a plant and an adequate amount of soil and sufficient roots to sustain its life may be transplanted from one location to a new location.

Another object of the plant transplanter is to provide the means by an inturned lip along a side opening in the cylindrical blade to force plant root system and sufficient undisturbed soil to move with transplanter when it is turned in clockwise rotation to sever roots that extend below cylindrical blade and through side opening through which plant was initially inserted before blade containing plant is lifted from its inserted-in-the-ground position.

Another object of this invention is to provide a transplanter with a novel ejector assembly to effect easy removal of plant from cylindrical blade after it has been extracted from the ground.

Another object of the invention is to provide a foot bar to use in applying pressure by either foot to force cylindrical blade into soil around plant to be extracted and transplanted.

Another object of the invention is to make precise holes with transplanter to receive identical sized plugs containing plants which have been extracted with the same cylindrical blade.

Still another object of the invention is to provide both fixedly as well as removably attached handle alternatives in the manufacturing of plant transplanters.

And another object of the invention is to provide alternate frame designs to cooperate with novel plant ejector assembly in holding said assembly in vertical position as it moves upwardly and downwardly in the cylindrical blade and frame.

Another object of this invention is to provide a transplanter with a sharpened edge along opening of cylindrical blade to cooperate with inturned lip along other edge of opening when transplanter is turned in clockwise rotation to prepare plant to be transplanted for easy removal from the ground.

Further details and additional features of this plant transplanter will be apparent to those skilled in the art to which it relates from the following specifications, claims and drawings in which briefly:

Figure 1:
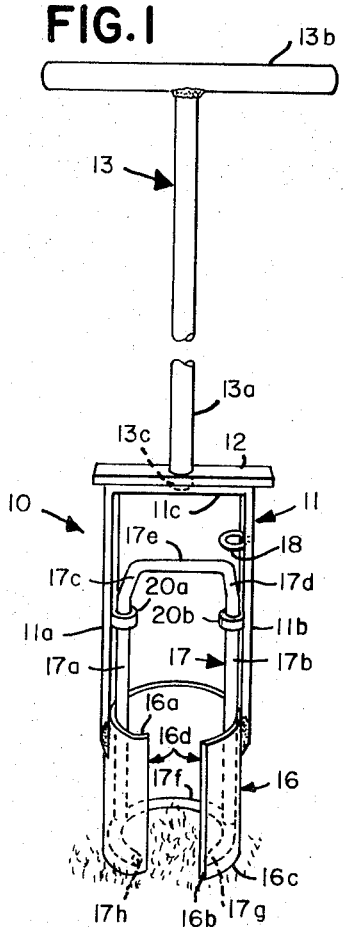
FIG. 1 is a detailed perspective view of this invention.
Figure 2:
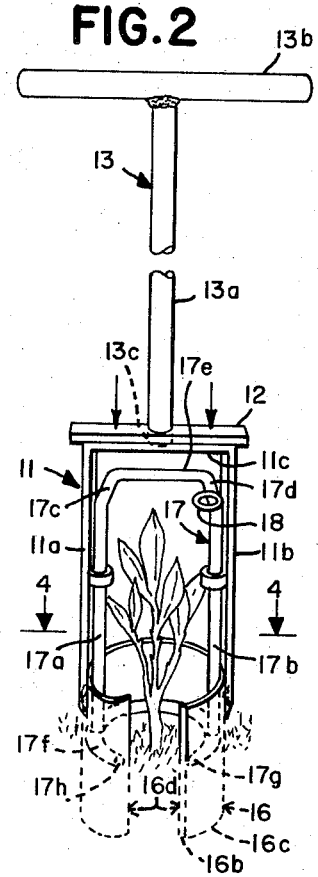
FIG. 2 is a perspective view showing invention containing plant.
Figure 4:
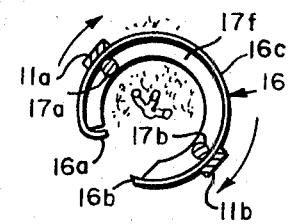
FIG. 4 is a sectional view along line 4—4 of FIG. 2.

Referring to the drawing in detail reference numeral 10 in FIG. 1 designates a plant transplanter which is provided with a T-shaped handle 13 fixedly attached to a frame 11 in a hole 13c which is provided in alignment through foot bar 12 and top frame member 11c to receive lower end of handle member 13a. Transplanter 10 is also equipped with a cylindrical-shaped blade 16 fixedly attached at top sides to lower ends of side frame members 11a and 11b. Said cylindrical blade is provided with opening 16d for side insertion of plant and it is further equipped with an inturned lip 16a and sharpened edge 16b which cooperate by said inturned lip forcing soil around plant root system within cylindrical blade to turn with said blade 16 as said sharpened edge 16b cuts roots and soil when transplanter is turned in clockwise rotatation as shown in FIG. 4. Said inturned lip 16a forces soil and plant within cylindrical blade to turn in said clockwise movement with transplanter and said sharpened edge 16b cuts through remaining soil and roots left intact when transplanter blade 16 was initially inserted into ground around plant to be extracted.

A foot bar 12 is fixedly mounted on top frame member 11c for use to apply pressure with either foot in forcing cylindrical blade 16 into ground. A T-shaped handle 13 is fixedly attached as shown in FIG. 1 to guide transplanter in its various uses. Said handle 13 is provided with a fixedly attached cross bar member 13b mounted perpendicularly on handle member 13a. Pressure may also be applied to said cross bar 13b to force insertion of cylindrical blade 16 which is sharpened around lower extremity 16c for easy penetration into ground and said handle crossbar 13b is also used to turn entire transplanter in clockwise rotary movement after it is inserted to desired depth around plant to complete the operation of severing roots which extend outwardly through blade opening 16d and below cylindrical blade 16 before extraction of plant by lifting upwardly on said handle crossbar member 13a.

The transplanter is provided with an ejector 17 which has an ejector ring 17f fixedly and perpendicularly attached to ejector side rod members 17a and 17b. Said ejector ring has an opening which aligns with cylindrical blade opening 16d to admit plant into said blade 16. One end of said ejector ring 17 is cut at an approximate 90° angle at 17h to slideably cooperate with inturned lip 16a of cylindrical blade 16 as ejector assemly 17 moves slideably upwardly and downwardly in plant transplanter. The other end 17g of ejector ring 17f is tapered along the inside edge of said ring at approximately an angle of 45° to prevent obstruction of entry of plants into cylindrical blade 16 and to avoid possible damage to foliage. Ejector assembly 17 has side members 17a and 17b bent at upper ends in a configuration so as to form a foot piece identified by numbers 17c, 17d, and 17e, which projects outwardly at approximately 90° on side of transplanter opposite opening 16d in cylindrical blade 16 so as not to interfere with entry of plant into said blade. Said foot piece composed of side members 17c, 17d and 17e — an end member — provides leverage means to eject plant from cylindrical blade 16 by applying downward pressure with foot on said foot piece.

Ejector assembly 17 is slideably and adjustably mounted in transplanter frame by use of guide eyes 20a and 20b which are fixedly attached to inside of frame members 11a and 11b as shown in FIG. 1. Said guide eyes 20a and 20b receive side rod members 17a and 17b respectively of ejector assembly 17. Ejector assembly 17 is further slideably controlled by cylindrical blade 16 in which ejector ring 17f cooperates by upwardly and downwardly movement along inside walls of said blade.

Figure 3:
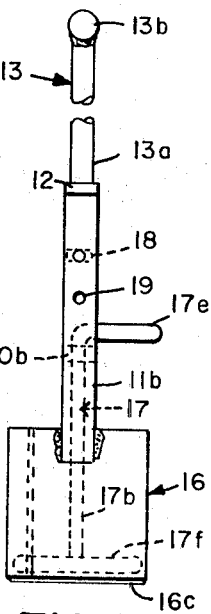
FIG. 3 is a side elevation of FIG. 1.

The limits of upwardly and downwardly movement of ejector assembly 17 is controlled by an adjustable means provided by threaded holes 19 along frame member side 11b as shown in FIG. 1 and FIG. 3 which receive eye bolt 18 on inside of said frame member 11b to serve as an adjustable stop which cooperates with foot piece side member 17d of ejector assembly 17 as shown in FIG. 1. Maximum depth of penetration of cylindrical blade 16 may be achieved by removal of adjustable eye bolt 18, in which case ejector assembly movement upwardly is controlled by foot piece sides 17c and 17d being stopped by contact with underside of frame member 11c. Ejector side rod members 17a and 17b are of sufficient length to prevent ejector ring 17f from extending above the top of cylindrical blade 16 when said ejector assembly 17 is raised upwardly to its maximum height.

Figure 6:
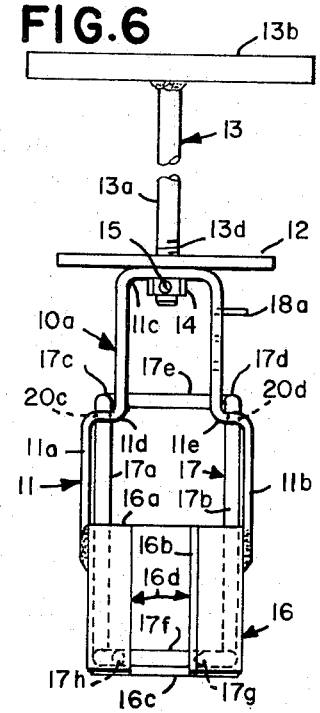
FIG. 6 is a front elevation showing frame design modification.
Figure 7:
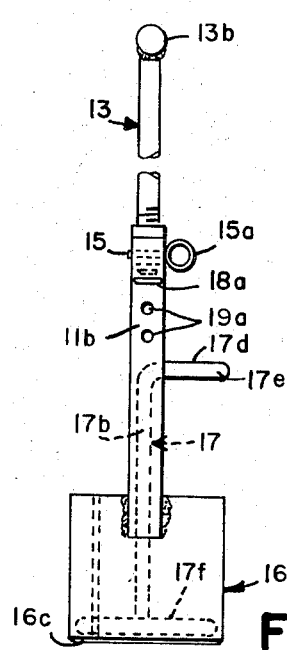
FIG. 7 is a side elevation of FIG. 6.
Figure 5:
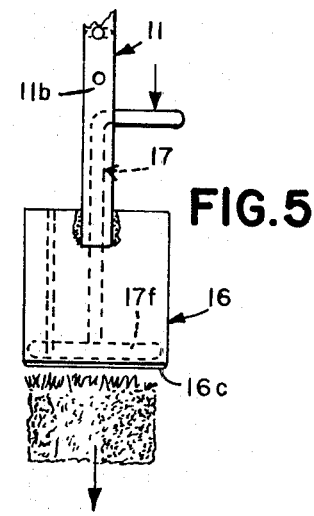
FIG. 5 is a side elevation of FIG. 1 showing plant plug ejected.

An alternate means of frame construction is shown in FIG. 6 and FIG. 7 in which the numeral 10a in FIG. 6 designates a plant transplanter in which the handle 13a is removably attached in threaded and aligned hole provided in central portion of foot bar 12 and top frame member 11c to which a threaded nut 14 as shown in FIG. 6 is fixedly attached. The threaded end of 13d of handle member 13a is received in said aligned threaded holes in foot bar 12, frame member 11c and fixedly attached nut 14 to receive a pin 15a which is horizontally inserted through nut 14 and threaded handle member end 13d to prevent handle 13 from turning in said threaded hole when transplanter 10a is rotated in clockwise movement.

The frame of transplanter 10a as shown in FIG. 6 has side members 11a and 11b provided with offsets 11d and 11e which have centrally located guide holes 20c and 20d respectively to receive ejector side rod members 17a and 17b in vertical alignment with frame side members 11a and 11b as ejector assembly 17 moves upwardly and downwardly.

The alternate means of frame design as shown in FIG. 6 also provides holes 19a shown in FIG. 7 into which threaded pin 18a is received, with said pin projecting outwardly for adjusting the depth of penetration of cylindrical blade 16 by an eye bolt 18a placed in desired adjustment hole 19a on outside of frame member 11b to control upwardly movement of ejector assembly 17. Upward movement of ejector assembly is stopped when foot piece side member 17d as shown in FIG. 7 contacts eyebolt 18a. Maximum depth of penetration of cylindrical blade 16 may be secured by removal of eyebolt 18a in which case the underside of foot bar 12 serves as the stop for ejector assembly 17 when said ejector foot piece side members 17c and 17d move upwardly and contact said foot bar 12. Ejector ring 17f, in addition to its ejection function serves in cooperation with guide holes 20c and 20d provided in offset segments of side frame members 11a and 11b respectively as shown in FIG. 6 to hold ejector assembly in slideably vertical position in transplanter cylindrical blade and frame. Ejector assembly-side-member rods 17a and 17b are fixedly attached to ejector ring 17f and extend upwardly through said guide holes 20c and 20d respectively and move upwardly and downwardly as ejector assembly operates with insertion of transplanter cylindrical blade 16 into the ground and subsequent ejection of plant by applying foot pressure on foot piece 17e which along with foot piece side members 17c and 17d positioned approximately at right angles to said ejector side rods 17a and 17b respectively are all integral parts of the ejector assembly.

While I have shown and described a preferred form of the invention it is apparent that it is capable of variation in materials from which it is constructed and modification from the form shown so that the scope thereof should be limited only by the proper scope of the claims appended hereto.

What I claim is:

1. A plant transplanter for extracting and transplanting a plant consisting of a sharpened cylindrical blade with a vertical side plant entry opening extending along a side portion of said cylindrical blade, a rectangular frame with bottom side members fixedly attached to the opposite top side portions of said cylindrical blade, a foot bar mounted fixedly on top of said rectangular frame for application of foot pressure for easy insertion of said cylindrical blade into the ground, a cross bar handle fixedly attached to said rectangular frame at the central portion of said foot bar to press and guide said cylindrical blade downwardly into the soil around said plant to be extracted and for use in rotation of said cylindrical blade to loosen said plant before lifting said cylindrical blade containing said plant from said ground, said rectangular frame is provided with guide eyes mounted on the inner side of the side members of said retangular frame to slidably receive and control the vertical alignment of a reciprocating plant ejector means provided with an ejector ring fixedly and horizontally connected to the lower ends of two side rod members with the upper extremities of said side rod members formed into a rectangular and horizontal configuration to provide a foot piece for applying pressure downwardly to eject said plant from said cylindrical blade, said ejector foot piece extends outwardly from said rectangular frame side members on the side opposite said plant entry opening which is centrally aligned between said side members of said rectangular frame in said side portion of said cylindrical blade to prevent obstruction of entry of said plant or damage thereto by said downwardly pressure and movement of said ejector foot piece, said ejector ring is received within said cylindrical blade with said ejector ring moving upwardly in said cylindrical blade as said cylindrical blade is inserted into said ground around said plant to be extracted from said ground, and said ejector ring moves downwardly within said cylindrical blade when said plant is ejected by application of pressure on said ejector assembly foot piece which moves said ejector side rod members received in said guide eyes slidably downward and forces said ejector ring to eject said extracted plant usually into a hole made by said transplanter.

2. In a plant transplanter of the cylindrical blade type, the combination as set forth in claim 1, further comprising means of causing said plant to rotate with said cylindrical blade by an inturned lip formed by bending inwardly one edge of said vertical plant entry opening in said side portion of said cylindrical blade, and the other side of said vertical plant entry opening in said cylindrical blade is provided with a sharpened edge to cut through said soil and the remaining roots of said plant left uncut as said cylindrical blade is inserted into said ground, but which are cut when said blade after said insertion into said ground is turned by rotary movement of said cross bar handle, said rotary movement of said cylindrical blade also loosens and/or breaks said roots for easy extraction when said plant has said roots that extend beneath the lower sharpened extremity of said cylindrical blade.

3. In a plant transplanter of the cylindrical blade type as set forth in claim 1, further characterized by said reciprocating plant ejector assembly being equipped with said ejector ring containing an opening which aligns with said vertical plant entry opening in said side portion of said cylinderical blade being cut on one end at an approximate 90° angle to cooperate with said inturned lip by removing said soil from the inside corner formed by said inturned lip as said ejector ring reciprocates upwardly and downwardly, and the other end of said ejector ring nearest said sharpened edge of said vertical plant entry opening in said side portion of said cylindrical blade is tapered on its inner side at an angle of approximately 45° to prevent obstruction of said entry of said plant into said vertical plant entry opening in said side portion of said cylindrical blade to avoid possible damage to the foliage or stem of said plant on said entry into said cylindrical blade and subsequent said reciprocating ejector assembly movement.

4. In a plant transplanter of the cylindrical blade type, the combination as set forth in claim 1, further provides adjustment means by one side frame member of said rectangular frame being equipped with threaded holes to receive an eye bolt for use as a stop in controlling said adjustment of the movement upwardly of said reciprocating ejector assembly as said cylindrical blade is inserted into said ground, maximum depth by said adjustment means may be obtained for said insertion of said cylindrical blade into said ground by the removal of said eye bolt from said inside of said side member containing said threaded holes provided for receiving said eye bolt, which permits said ejector foot piece to rise upwardly until contact is made with the lower side of the transplanter's said top rectangular frame member, said ejector assembly is controlled in its downwardly movement by the underside of said ejector foot piece making contact with said guide eyes mounted on the said inner side of said frame members.

5. In a plant transplanter of the cylindrical blade type, the combination as set forth in claim 1, further comprising an alternate means of providing a removably attached cross bar handle by threaded means through said foot bar, top frame member and a fixedly attached nut aligned to receive threaded handle end, and a horizontal hole is provided through said nut and said threaded end of cross bar handle member to receive pin to prevent handle from turning when transplanter is rotated.

* * * * *